US012687954B2

(12) United States Patent
   Ma

(10) Patent No.: US 12,687,954 B2
(45) Date of Patent: Jul. 21, 2026

(54) TOUCH DISPLAY PANEL AND DISPLAY DEVICE

(71) Applicant: Wuhan China Star Optoelectronics Semiconductor Display Technology Co., Ltd., Wuhan (CN)

(72) Inventor: Liang Ma, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 512 days.

(21) Appl. No.: 17/619,584

(22) PCT Filed: Dec. 9, 2021

(86) PCT No.: PCT/CN2021/136743
   § 371 (c)(1),
   (2) Date: Aug. 25, 2024

(87) PCT Pub. No.: WO2023/097737
   PCT Pub. Date: Jun. 8, 2023

(65) Prior Publication Data
   US 2024/0419285 A1      Dec. 19, 2024

(30) Foreign Application Priority Data
   Nov. 30, 2021   (CN) .......................... 202111448250.8

(51) Int. Cl.
   *G06F 3/041*       (2006.01)
   *G06F 3/044*       (2006.01)

(52) U.S. Cl.
   CPC .......... *G06F 3/0446* (2019.05); *G06F 3/0412* (2013.01)

(58) Field of Classification Search
   None
   See application file for complete search history.

(56) References Cited

U.S. PATENT DOCUMENTS

2017/0236886 A1      8/2017   Matsueda

FOREIGN PATENT DOCUMENTS

| CN | 104956427 A | 9/2015 | |
| CN | 107039467 A | 8/2017 | |
| CN | 109031828 A | 12/2018 | |
| CN | 109887458 A | 6/2019 | |
| CN | 113485587 A | * 10/2021 | ........... G06F 3/0448 |

OTHER PUBLICATIONS

Translation of CN-113485587-A into English; Zhou (Year: 2021).*

* cited by examiner

*Primary Examiner* — Brian M Butcher
(74) *Attorney, Agent, or Firm* — PV IP PC; Christopher S. Ruprecht; Wei Te Chung

(57)      ABSTRACT

The present application provides a touch display panel and a display device. In the touch display panel, the first channel wirings are arranged in in a first direction, each of the first channel wirings is electrically connected to at least one of the first control units, each of the first control units is electrically connected to a corresponding one of the touch wirings. The first control units are arranged in at least two rows in a second direction. In the first direction, adjacent two of the first control units in adjacent ones of some of the rows at least partially overlap each other.

18 Claims, 6 Drawing Sheets

TOUCH DISPLAY PANEL AND DISPLAY DEVICE

CROSS-REFERENCE TO RELATED APPLICATION

This application is a national phase application under 35 U.S.C. § 371 of PCT Application No. PCT/CN2021/136743 filed Dec. 9, 2021, which claims priority to Chinese Application No. 202111448250.8 filed Nov. 30, 2021, the contents of which are incorporated herein by reference in their entirety.

FIELD OF INVENTION

The present application relates to a field of display technologies, especially to a touch display panel and a display device.

BACKGROUND OF INVENTION

With development of touch technologies, electronic devices having touch functions extensively enter people's lives and works. Display panels having the touch function become a hotspot for research in the field of displays. A touch structure of a conventional touch display panel comprises plugin-in type touch structure, touch on cell structure, and touch in cell structure.

Technical Issue

It is known that touch on cell structure and touch in cell structure can drastically lower an entire thickness of a touch display panel. Both the touch on cell structure and touch in cell structure of the conventional display panel can be classified into a self-capacitance touch and a mutual capacitance touch. The self-capacitance touch, because of simple processes and outstanding performance, gradually becomes a development hotspot of various manufacturers. Driving principles and design of the self-capacitance touch result in increase of a number of touch wirings, and therefore, a demux circuit structure is used to reduce a number of bonding pads. However, when touch wirings become more, the demux circuit would increase a lateral size of the display panel, which disadvantages achieving a narrow frame.

SUMMARY OF INVENTION

Technical Solution

The present application provides a touch display panel and a display device to solve a technical issue that the demux circuit of the conventional touch display panel would increase a lateral size of the display panel to disadvantage achievement of a narrow frame.

The present application provides a touch display panel, comprising:
  a plurality of touch wirings, wherein the touch wirings are arranged in a first direction; and
  a demux circuit, wherein the demux circuit comprises a plurality of first control units and a plurality of first channel wirings, the first channel wirings are arranged in the first direction, each of the first channel wirings is electrically connected to at least one of the first control units, and each of the first control units is electrically connected to a corresponding one of the touch wirings;

wherein the first control units are arranged in at least two rows in a second direction, the second direction intersects the first direction; and in the first direction, adjacent two of the first control units in adjacent two of at least some of the rows at least partially overlap each other.

Optionally, in some embodiments of the present application, the touch display panel further comprises first connection wirings, and the first control units are connected to the first channel wirings respectively through the first connection wirings;
  wherein in the second direction, the first connection wirings corresponding to at least one of the first control units bend on edges of the first control units in adjacent ones of the rows.

Optionally, in some embodiments of the present application, in the second direction, the first control units corresponding to a $(2M-1)^{th}$ one of the touch wirings are arranged in a first row, the first control units corresponding to a $2M^{th}$ of the touch wirings are arranged in a second row, wherein M is an integer greater than or equal to 1.

Optionally, in some embodiments of the present application, each number N of adjacent ones of the touch wirings are electrically connected to the same one of the first channel wirings, N is an integer greater than or equal to 2; the demux circuit further comprises signal transmission lines, the signal transmission lines comprise driver wirings of a number N, enabling wirings of a number N, and control wirings of a number N, and the signal transmission lines are arranged in the second direction;
  wherein the first control units of the number N electrically connected to the same one of the first channel wirings are electrically connected to corresponding ones of the driver wirings, the enabling wirings, and the control wirings respectively.

Optionally, in some embodiments of the present application, the touch display panel further comprises second connection wirings, the first control units are electrically connected to corresponding ones of the control wirings through the second connection wirings;
  wherein in the second direction, the second connection wiring corresponding to at least one of the first control units bends on edges of the first control units in adjacent ones of the rows.

Optionally, in some embodiments of the present application, the first control unit comprises a first transistor and a second transistor;
  a gate electrode of the first transistor is electrically connected to a corresponding one of the control wirings, a source electrode of the first transistor is electrically connected to a corresponding one of the touch wirings, a drain electrode of the first transistor is electrically connected to a corresponding one of the first channel wirings; a gate electrode of the second transistor is electrically connected to a corresponding one of the enabling wirings, a source electrode of the second transistor is electrically connected to a corresponding one of the driver wirings, and a drain electrode of the second transistor is electrically connected to a corresponding one of the touch wirings.

Optionally, in some embodiments of the present application, in the second direction, the signal transmission lines are located on a side of the first control units of the second row away from the first control units of the first row.

Optionally, in some embodiments of the present application, in the second direction, the signal transmission lines correspondingly connected to the first control units of the first row are located between the first control units of the first row and the first control units of the second row; and the signal transmission lines correspondingly connected to the first control units of the second row are located on the side of the first control units of the second row away from the first control units of the first row.

Optionally, in some embodiments of the present application, in the first direction, in the first control units of the first row, the first control units located in an odd column are arranged in a first sub-row, the first control units in an even column are arranged in a second sub-row, in the first control units of the second row, the first control units located in the odd columns are arranged in a third sub-row, the first control units in the even column are arranged in a fourth sub-row.

Optionally, in some embodiments of the present application, the demux circuit further comprises a plurality of second control units and a plurality of second channel wirings;

The second control units are disposed on a side of the first channel wirings away from the first control units; the second channel wirings are arranged in the first direction, each of the second channel wirings is electrically connected to at least one of the first channel wirings; in the first channel wirings commonly employing the same one of the second channel wirings, each of the first channel wirings is connected to the second channel wiring through a corresponding one of the second control units, the second control units is configured to control connection between the second channel wiring and a corresponding one of the first channel wirings.

Optionally, in some embodiments of the present application, the second control units in the second direction are arranged in at least two rows.

Optionally, in some embodiments of the present application, the touch display panel further comprises touch electrodes, the touch electrodes are arranged in an array, the touch electrodes are correspondingly connected to the touch wirings one by one;

wherein the touch display panel comprises a first end portion and a second end portion disposed oppositely, the demux circuit is disposed at the first end portion, in the second direction, in each column of the touch electrodes, the touch wirings correspondingly connected to the touch electrodes arranged sequentially from the first end portion to the second end portion are sequentially arranged in the first direction.

Correspondingly, the present application also provides a display device, comprising a touch display panel and a touch chip, and the touch display panel comprising:

a plurality of touch wirings, wherein the touch wirings are arranged in a first direction; and a demux circuit, wherein the demux circuit comprises a plurality of first control units and a plurality of first channel wirings, the first channel wirings are arranged in the first direction, each of the first channel wirings is electrically connected to at least one of the first control units, and each of the first control units is electrically connected to a corresponding one of the touch wirings;

wherein the first control units are arranged in at least two rows in a second direction, the second direction intersects the first direction; and in the first direction, adjacent two of the first control units in adjacent two of at least some of the rows at least partially overlap each other;

wherein the touch chip is connected to the touch display panel for receiving touch signals Optionally, in some embodiments of the present application, an interval between adjacent two of the first control units in the same column is less than a width of the first control unit.

Optionally, in some embodiments of the present application, the touch display panel further comprises first connection wirings, and the first control units are connected to the first channel wirings respectively through the first connection wirings;

wherein in the second direction, the first connection wirings corresponding to at least one of the first control units bend on edges of the first control units in adjacent ones of the rows.

Optionally, in some embodiments of the present application, in the second direction, the first control units corresponding to a $(2M-1)^{th}$ one of the touch wirings are arranged in a first row, the first control units corresponding to a $2M^{th}$ of the touch wirings are arranged in a second row, wherein M is an integer greater than or equal to 1.

Optionally, in some embodiments of the present application, each number N of adjacent ones of the touch wirings are electrically connected to the same one of the first channel wirings, N is an integer greater than or equal to 2; the demux circuit further comprises signal transmission lines, the signal transmission lines comprise driver wirings of a number N, enabling wirings of a number N, and control wirings of a number N, and the signal transmission lines are arranged in the second direction;

wherein the first control units of the number N electrically connected to the same one of the first channel wirings are electrically connected to corresponding ones of the driver wirings, the enabling wirings, and the control wirings respectively.

Optionally, in some embodiments of the present application, the touch display panel further comprises second connection wirings, the first control units are electrically connected to corresponding ones of the control wirings through the second connection wirings;

wherein in the second direction, the second connection wiring corresponding to at least one of the first control units bends on edges of the first control units in adjacent ones of the rows.

Optionally, in some embodiments of the present application, the touch display panel further comprises touch electrodes, the touch electrodes are arranged in an array, the touch electrodes are correspondingly connected to the touch wirings one by one;

wherein the touch display panel comprises a first end portion and a second end portion disposed oppositely, the demux circuit is disposed at the first end portion, in the second direction, in each column of the touch electrodes, the touch wirings correspondingly connected to the touch electrodes arranged sequentially from the first end portion to the second end portion are sequentially arranged in the first direction.

Advantages

The present application provides a touch display panel and a display device. The touch display panel comprises touch wirings and a demux circuit. The demux circuit comprises a plurality of first control units and a plurality of first channel wirings. A plurality of first channel wirings are arranged in a first direction, each of the first channel wirings is electrically connected to at least one of the first control units, each of the first control units is electrically connected to a corresponding one of the touch wirings. In a second direction, the present application disposes a plurality of first control units in at least two rows, and adjacent two of the first control units in adjacent ones of the rows at least partially overlap each other such that a lateral size of a demux circuit is effectively reduced to improve application possibility of the self-capacitance touch in ultra-narrow frame products.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

In descriptions of the present application, it should be understood that the descriptions related to "first", "second", and the like in the present invention are for descriptive purposes only, and cannot be interpreted as explicit or implicit indication of relative importance or indirect indication of the number of technical features. Therefore, a feature limited with "first", "second" can expressly or implicitly include one or more features, and thus cannot be understood as limits to the present application.

The present application provides a touch display panel and a display device, which will be described in detail as follows. It should be explained that the order of descriptions in the following embodiments is not to limit the preferred order of the embodiments.

Figure 1:
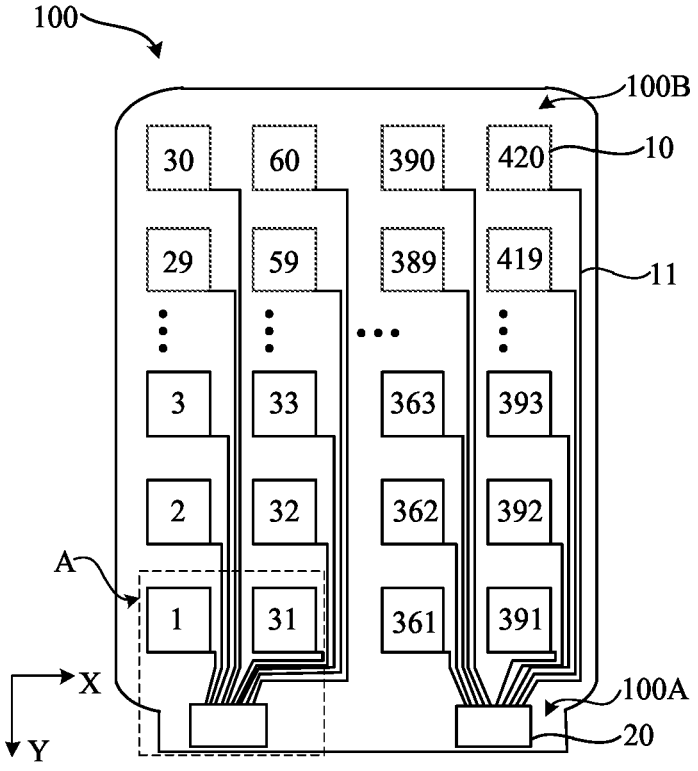
FIG. 1 is a schematic structural view the touch display panel provided by the present application.
Figure 2:
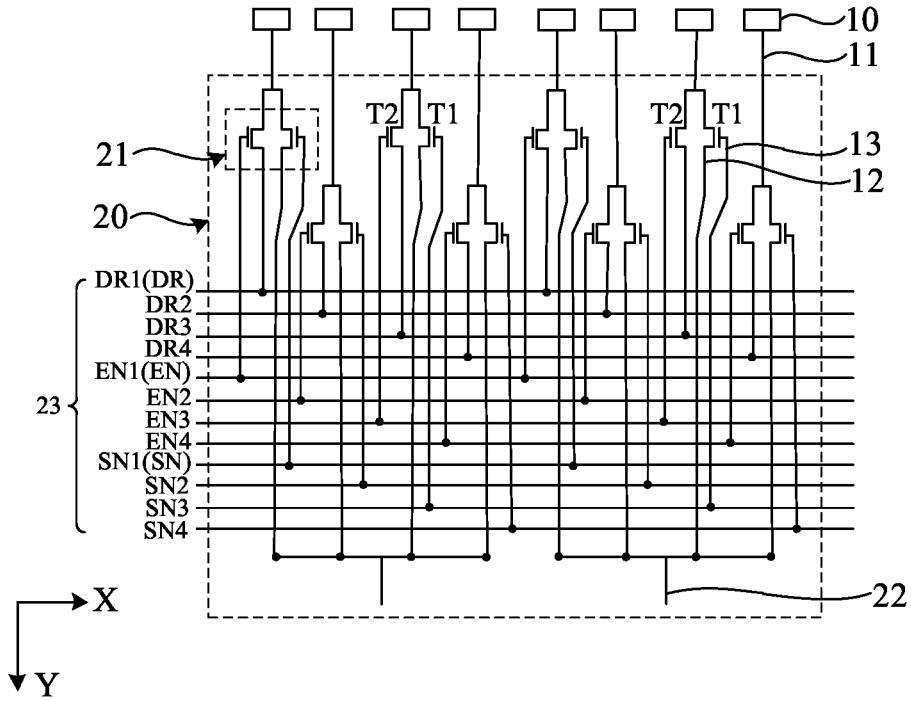
FIG. 2 is a first enlarged schematic structural view of a region A of the touch display panel as shown in FIG. 1.

With reference to FIGS. 1 to 2, FIG. 1 is a schematic structural view the touch display panel provided by the present application. FIG. 2 is a first enlarged schematic structural view of a region A of the touch display panel as shown in FIG. 1. In the present application, the touch display panel 100 comprises a plurality of touch electrodes 10, a plurality of touch wirings 11, and a demux circuit 20. The demux circuit 20 comprises a plurality of first control units 21 and a plurality of first channel wirings 22.

The touch electrodes 10 are arranged in an array. The touch wirings 11 are connected to the touch electrodes 10 one by one. The touch wirings 11 are arranged in a first direction X. the first channel wirings 22 are arranged in the first direction X. Each of the first channel wirings 22 is electrically connected to at least one of the touch wirings 11. In the touch wirings 11 commonly using the same one of the first channel wirings 22, each of the touch wirings 11 is connected to the first channel wirings 22 through a corresponding one of the first control units 21. Namely, each of the first channel wirings 22 is electrically connected to at least one of the first control units 21. The first control units 21 is configured to control connection between the signal wiring 22 and a corresponding one of the touch wirings 11.

The first control units 21 in a second direction Y are arranged in at least two rows, the second direction Y intersects the first direction X. In the first direction X, adjacent two of the first control units 21 in adjacent ones of some of the rows at least partially overlap each other. In particular, the first control units 21 can be arranged in two rows, three rows, or more rows in the second direction Y, which can be designed specifically according to specification requirements of the touch display panel 100 and the number of the touch wirings 11, and the present application has no limit thereto.

The first direction X can perpendicularly or obliquely intersect the second direction Y, specifically depending on requirements of the display panel and manufacturing designs of the display panel.

The touch wirings 11 and the touch electrodes 10 can be disposed in the same layer and can be disposed in different layers.

It can be understood that the touch display panel 100 provided by the present application belongs to a self-capacitance touch. The self-capacitance touch operates by employing current sensing of a human body, and it is a touch mode sensing touch signals by combining electrodes and human body characteristics. When the human body (a finger) touches a screen of the touch display panel 100, due to an electrical field of the human body, a coupling capacitor is formed between a finger and the touch electrodes 10 to result in variation of the capacitor. According to the variation of the capacitor, a touch location of a finger can be determined. Because each of the touch electrodes 10 needs to be connected to the touch wirings 11, the self-capacitance touch needs to the touch wirings 11 of a greater number.

In the touch display panel 100 of the present application provides, by disposing the demux circuit 20, the touch wirings 11 can commonly employ the same one of the first channel wirings 22 to reduce a number of bonding pads in the touch display panel 100. Furthermore, disposing the first control units 21 in the second direction Y in at least two rows with adjacent two of the first control units 21 in adjacent ones of some of the rows at least partially overlapping each other can effectively reduce of a lateral size (namely, the size in the first direction X) the demux circuit 20, improve application possibility of the self-capacitance touch in ultra-narrow frame products.

In the present application, an interval between adjacent two of the first control units 21 of the same column is less than a width of the first control units 21. It can be understood that the first control units 21 are arranged in a row, to prevent shorting of wirings, in adjacent three of the first control units 21, an interval between the two first control units 21 on left and rights sides is greater than a width (namely, the size in the first direction X) of the first control units 21 to guarantee a sufficient space between the two first control units 21 to accommodate middle ones of the first control units 21 to prevent shorting of wirings. In the present application, the first control units 21 in the second direction Y are arranged in at least two rows, disposing an interval between adjacent two of the first control units 21 located in the same column to be less than a width of the first control units 21 can further reduce a lateral size of the demux circuit 20.

In the present application, the touch display panel 100 further comprises first connection wirings 12. the first control units 21 are correspondingly electrically connected to the first channel wirings 22 through the first connection wirings 12. In the second direction Y, the first connection wiring 12 corresponding to at least one of the first control units 21 bends on edges of the first control units 21 in adjacent ones of the rows to bypass the first control units 21 in adjacent ones of the rows.

It can be understood that because the first connection wiring 12 bends on the edges of the first control units 21 in adjacent ones of the rows, the touch display panel 100 can have more space for accommodating the first control units 21 in adjacent ones of the rows to lower layout difficulty of the first control units 21 of the touch display panel 100.

In the present application, each of the first channel wirings 22 can be connected to at least one of the touch wirings 11. For example, each of the first channel wirings 22 can be connected to one, two, three, four, or more of the touch wirings 11. It can be designed specifically according to the number of the touch wirings 11.

In particular, in the present application, each number N of adjacent ones of the touch wirings 11 are electrically connected to the same one of the first channel wirings 22, N is an integer greater than or equal to 2. For example, each adjacent three of the touch wirings 11 are electrically connected to the same one of the first channel wirings 22. Each adjacent four of the touch wirings 11 are electrically connected to the same one of the first channel wirings 22. Each adjacent ten of the touch wirings 11 are electrically connected to the same one of the first channel wirings 22. The present application has no limit thereto. The solution makes signal transmission in the touch display panel 100 more even.

In the present application, arrangement of the touch wirings 11 is not limited and only has to guarantee corresponding connection between the touch electrodes 10 and the touch wirings 11. However, because the touch electrodes 10 are arranged in an array, in the second direction Y, in the same column of the touch electrodes 10, lengths of corresponding ones of the touch wirings 11 are different. Lengths of different touch wirings 11 are different and result in different resistance to further result in different touch sensitivities.

Thus, in some embodiments of the present application, with further reference to FIG. 1, the touch display panel 100 comprises a first end portion 100A and a second end portion 100B disposed oppositely. The demux circuit 20 is disposed at the first end portion 100A. In the second direction Y, in each column of the touch electrodes 10, the touch wirings 11 correspondingly connected to the touch electrodes 10 sequentially arranged from the first end portion 100A to the second end portion 100B are sequentially arranged in the first direction X.

In particular, the present application uses 30*14 channels as an example for explanation, however it can not be understood as a limit of the present application. Namely, in the second direction Y, the touch electrodes 10 are arranged in 14 columns. Thirty touch electrodes 10 are arranged in a column. Four hundred and twenty touch electrodes 10 are disposed, and reference numerals are 1 to 420 (only some of the reference numerals are shown in the figures), which is not described one by one. Accordingly, Four hundred and twenty touch wirings 11 are disposed.

It can be understood that in the present embodiment, the touch wirings 11 correspondingly connected to the touch electrodes 10 sequentially arranged from the first end portion 100A to the second end portion 100B are sequentially arranged in the first direction X. As such, the touch wirings 11 located in odd columns in the second direction Y connected to the touch electrodes 10 of odd numbers, the touch wirings 11 located in even columns are connected to the touch electrodes 10 of even numbers. Namely, each column of the touch electrodes 10 are connected to corresponding ones of the touch wirings 11 according to the same discipline such that a wiring layout of the touch display panel 100 is more even.

With further reference to FIG. 2, in some embodiments of the present application, in the second direction Y, the first control units 21 corresponding to a $(2M-1)^{th}$ one of the touch wirings 11 are arranged in a first row. The first control units 21 corresponding to a $2M^{th}$ of the touch wirings 11 are arranged in the second row. M is an integer greater than or equal to 1. Namely, in the second direction Y, the present application divides the first control units 21 into two rows, which are odd rows and even rows. The present embodiment alternately arranges the first control units 21 in two rows regularly, which can simplify the manufacturing processes. Furthermore, the lateral size of the demux circuit 20 can be reduced by 40%.

Furthermore, the demux circuit 20 further comprises a signal transmission lines 23. The signal transmission lines 23 comprises driver wirings DR of a number N, enabling wirings EN of a number N, and control wirings SN of a number N. the signal transmission lines 23 are arranged in the second direction Y. The first control units 21 of a number N electrically connected to the same one of the first channel wirings 22 are electrically connected to the driver wirings DR, the enabling wirings EN, and the control wirings SN respectively.

The driver wirings DR are configured to provide driver signals to the touch electrodes 10 through the touch wirings 11. The enabling wirings EN are configured to the first control units 21 provides enabling signals. The control wirings SN are configured to provide control signals to the first control units 21. The first control units 21 are configured to achieve driver signal transmission under control of corresponding enabling signals. The first control units 21 are also configured to achieve connection of the first channel wirings 22 with one of the touch wirings 11 under control of corresponding control signal.

In the present application, the touch display panel 100 further comprises second connection wirings 13. the first control units 21 are correspondingly electrically connected to the control wirings SN through the second connection wirings 13. In the second direction Y, the second connection wiring 13 corresponding to at least one of the first control units 21 bends on edges of the first control units 21 in adjacent ones of the rows to bypass the first control units 21 in adjacent ones of the rows.

Similarly, because the second connection wirings 13 bend on the edges of the first control units 21 in adjacent ones of the rows, the touch display panel 100 can have more space to accommodate the first control units 21 in adjacent ones of the rows to lower layout difficult of the first control units 21 in the touch display panel 100.

Furthermore, in some embodiments of the present application, wirings of the first control units 21 connected to the driver wirings DR and/or the enabling wirings EN cab also adopt the bending manner in the above embodiment, which is not described repeatedly here. The present embodiment can reasonably use a layout space of the touch display panel 100 to further reduce the lateral size of the demux circuit 20.

In some embodiments of the present application, the first control units 21 comprises a first transistor T1 and a second transistor T2. A gate electrode of the first transistor T1 is electrically connected a corresponding one of the control wirings SN. A source electrode of the first transistor T1 is electrically connected to a corresponding one of the touch wirings 11. A drain electrode of the first transistor T1 is electrically connected to a corresponding one of the first channel wirings 22. A gate electrode of the second transistor T2 is connected to a corresponding one of the enabling wirings EN. A source electrode of the second transistor T2 is electrically connected to a corresponding one of the driver wirings DR. A drain electrode of the second transistor T2 is electrically connected to a corresponding one of the touch wirings 11.

The first transistor T1 and the second transistor T2 can be one ore more of low-temperature polycrystalline silicon thin film transistors, oxide semiconductor thin film transistors, or amorphous silicon thin film transistors. Furthermore, the first transistor T1 and the second transistor T2 can also be P-type transistors or N-type transistors. Furthermore, transistors in the present application can be disposed as the transistors of same type to prevent difference between the transistors of different types from negatively influencing touch sensitivity.

It can be understood that in one aspect, the first control units 21 is configured to control connection between the signal wirings 22 and the a corresponding one of the touch wirings 11. In another aspect, the first control units 21 is further configured to provide driver signals to the touch electrodes 10. Driver signals received by each of the touch electrodes 10 can be the same or different. In some embodiments of the present application, Driver signals supplied to each of the touch electrodes 10 are different under different modes. Thus, an abnormal point can be determined in an inspection phase.

It should be explained that the following embodiments of the present application all use an example that each adjacent four of the touch wirings 11 are electrically connected to the same one of the first channel wirings 22, and the signal transmission lines 23 comprise four of the driver wirings DR, four of the enabling wirings EN, and four of the control wirings SN, but it cannot be understood as a limit to the present application.

In particular, with further reference to FIGS. 2, four of the driver wirings DR are respectively the first driver wirings DR1, the second driver wiring DR2, the third driver wirings DR3 and the fourth driver wiring DR4. Four of the enabling wirings EN are the first enabling wiring EN1, the second enabling wiring EN2, the third enabling wiring EN3, and the fourth enabling wiring EN4. Four of the control wirings SN are the first control wirings SN1, the second control wiring SN2, the third control wirings SN3, and a the fourth control wiring SN4.

In the first direction X, the first control units 21 corresponding to a first one of the touch wirings 11 are electrically connected to the first driver wirings DR1, the first enabling wiring EN1, and the first control wirings SN1. The first control units 21 corresponding to a second one of the touch wirings 11 are electrically connected to the second driver wiring DR2, the second enabling wiring EN2, and the second control wiring SN2. The first control units 21 corresponding to a third one of the touch wirings 11 are electrically connected to the third driver wirings DR3, the third enabling wiring EN3, and the third control wirings SN3. The first control units 21 corresponding to a fourth one of the touch wirings 11 are electrically connected to a the fourth driver wiring DR4, a the fourth enabling wiring EN4, and a the fourth control wiring SN4, and as on, which is not described repeatedly one by one. Of course, a connection relationship in FIG. 2 is only illustrative and cannot be understood as a limit to the present application.

In the second direction Y, the signal transmission lines 23 are located on a side of the first control units 21 of a second row away from the first control units 21 of the first row.

Figure 3:
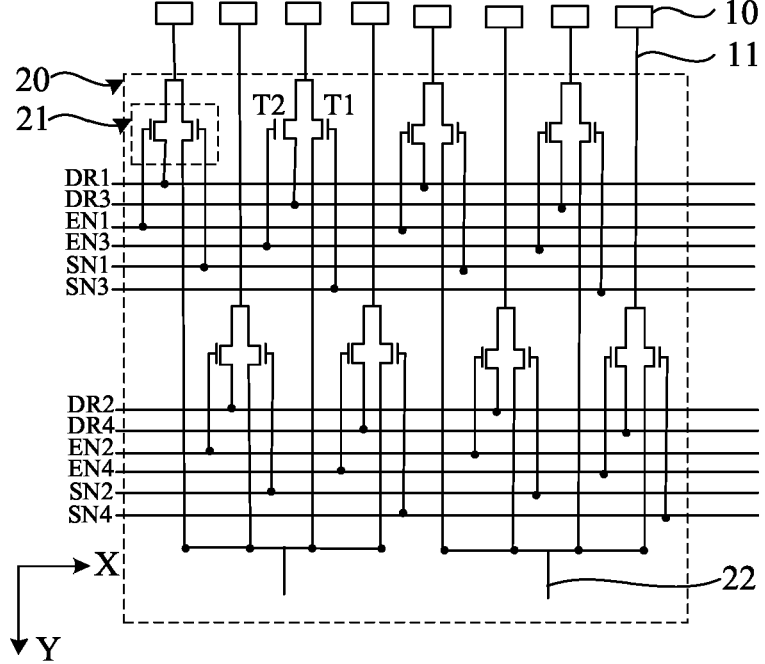
FIG. 3 is a second enlarged schematic structural view of a region A of the touch display panel as shown in FIG. 1.

With reference to FIG. 3, FIG. 3 is a second enlarged schematic structural view of a region A of the touch display panel as shown in FIG. 1. A difference from the structure in FIG. 2 is that in the present embodiment, in the second direction Y, Bit the signal transmission lines 23 correspondingly connected to the first control units 21 of the first row are located between the first control units 21 of the first row and the first control units 21 of the second row. The signal transmission lines 23 correspondingly connected to the first control units 21 of the second row are located on a side of the first control units 21 of the second row away from the first control units 21 of the first row.

In particular, the first driver wirings DR1, the third driver wirings DR3, the first enabling wiring EN1, the third enabling wiring EN3, the first control wirings SN1 and the third control wirings SN3 are arranged in the second direction Y, and are located between the first control units 21 of the first row and the first control units 21 of the second row.

The second driver wiring DR2, the fourth driver wiring DR4, the second enabling wiring EN2, the fourth enabling wiring EN4, the second control wiring SN2, and the fourth control wiring SN4 are arranged in the second direction Y, and the first control units 21 of the second row are away from a side of the first control units 21 of the first row.

It can be understood that both the lateral sizes of the first control units 21 of the first row and the first control units 21 of the second row are determined by the first transistor T1, the second transistor T2, and radial sizes of each wiring. The present embodiment, by disposing the signal transmission lines 23 in regions, makes both the lateral sizes of the first control units 21 of the first row and the first control units 21 of the second row determined by the first transistor T1, the second transistor T2 and a radial size of a single touch wiring 11.

Thus, in a first aspect, dividing the signal transmission lines 23 in regions makes a lateral size of the first control units 21 of the first row equal to a lateral size of the first control units 21 of the second row. The lateral size of the demux circuit 20 can be further decreased. In a second aspect, disposing the signal transmission lines 23 in regions makes a wiring layout of the demux circuit 20 more even. In a third aspect, disposing the signal transmission lines 23 in regions can reduce lengths of some wirings such that resistance loss is reduced and touch sensitivity is enhanced.

Figure 4:
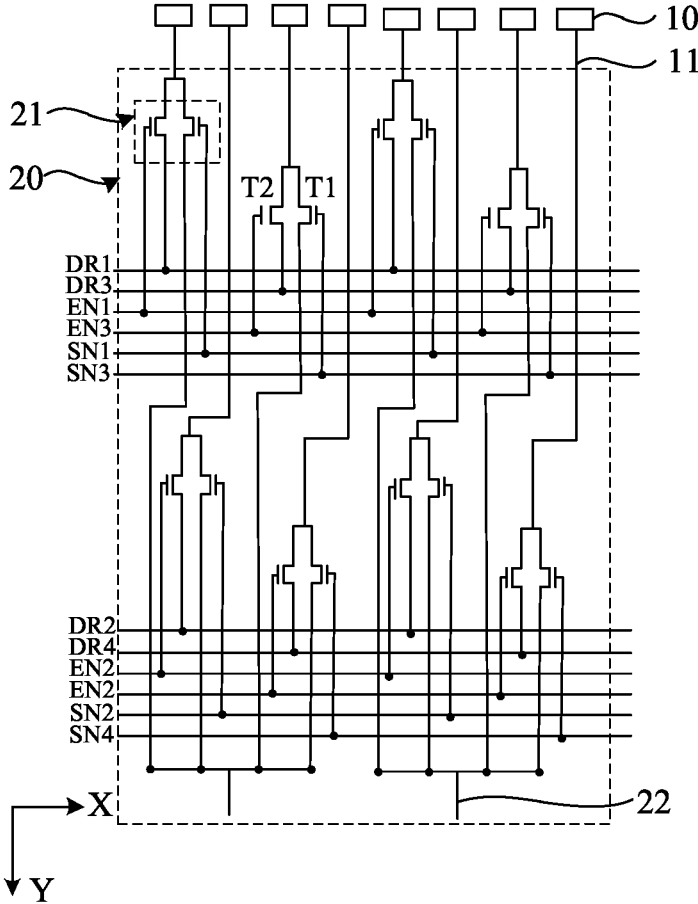
FIG. 4 is a third enlarged schematic structural view of a region A of the touch display panel as shown in FIG. 1.

With reference to FIG. 4, FIG. 4 is a third enlarged schematic structural view of a region A of the touch display panel as shown in FIG. 1. A difference from the structure as shown in FIG. 3 is that in the present embodiment, in the first direction X, in the first control units 21 of the first row, the first control units 21 located in the odd columns are arranged in first sub-row, and the first control units 21 located in the even columns are arranged in second sub-row. In the first control units 21 of the second row, the first control units 21 located in the odd columns are arranged in third sub-row, and the first control units 21 located in the even columns are arranged in fourth sub-row.

Namely, the present embodiment by disposing the first control units 21 of the first row as odd rows and even rows and disposing the first control units 21 of the second row as odd rows and even rows, can achieve minimization of the lateral size of the demux module 20.

Figure 5:
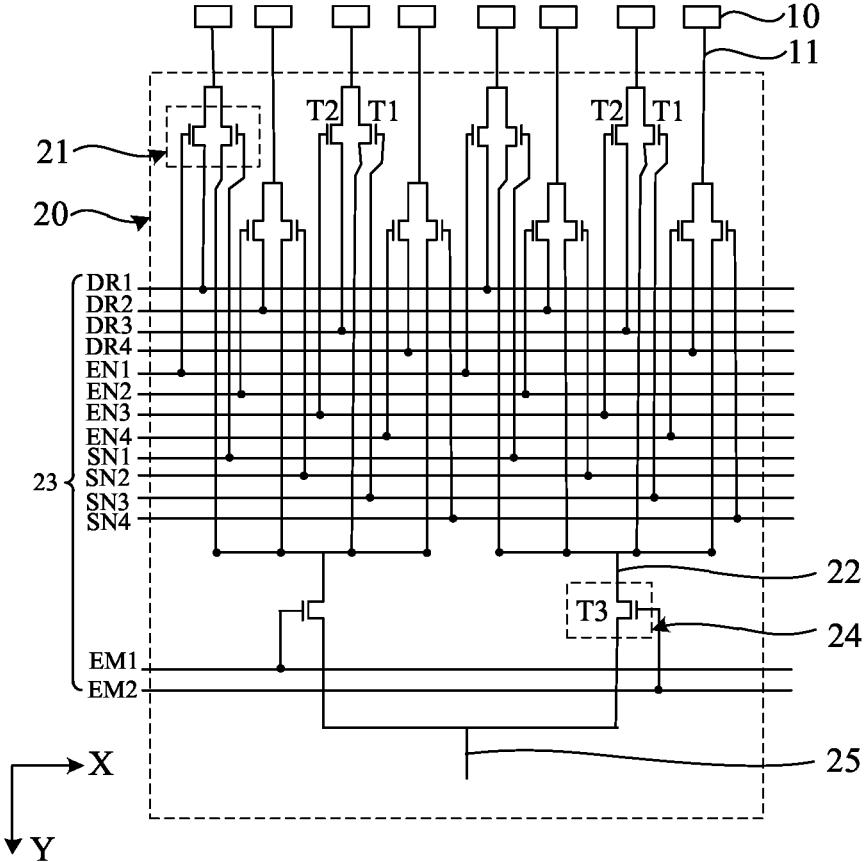
FIG. 5 is a fourth enlarged schematic structural view of a region A of the touch display panel as shown in FIG. 1.

With reference to FIG. 5, FIG. 5 is a fourth enlarged schematic structural view of a region A of the touch display panel as shown in FIG. 1. A difference from the structure in FIG. 2 is that in the present embodiment, the demux circuit 20 further comprises a plurality of second control units 24 and a plurality of second channel wirings 25.

The second control units 24 is disposed on a side of the first channel wirings 22 away from the first control units 21. The second channel wirings 25 are arranged in the first direction X. Each of the second channel wirings 25 is electrically connected to at least one of the first channel wirings 22. In the first channel wirings 22 commonly employing the same one of the second channel wirings 25, each of the first channel wirings 22 is connected to the second channel wiring 25 through a corresponding one of the second control units 24. The second control units 24 is configured to control connection between the second channel wiring 25 and a corresponding one of the first channel wirings 22.

Each of the second channel wirings 25 can be connected to at least one of the first channel wirings 22. For example, each of the second channel wirings 25 can be connected to one, two, three, four, or more of the first channel wirings 22. It can be specifically design according to the number of the touch wirings 11.

In particular, in the present application, each number N of adjacent ones of the first channel wirings 22 are electrically connected to the same second channel wirings 25, N is an integer greater than or equal to 2. For example, each adjacent three of the first channel wirings 22 are electrically connected to the same second channel wirings 25. Each adjacent four of the first channel wirings 22 are electrically connected to the same second channel wirings 25. Each adjacent ten of the first channel wirings 22 are electrically connected to the same second channel wirings 25. The present application has no limit thereto. The solution makes signal transmission in the touch display panel 100 more even.

It can be understood that the first control units 21 and the first channel wirings 22 constitute a first level demux unit. When the size of the touch display panel 100 is larger, or touch sensitivity required by the touch display panel 100 is higher, numbers of the touch electrodes 10 and the touch wirings 11 are greater. The first level demux unit cannot effectively reduce the number of the bonding pads of the touch display panel 100.

Thus, the present embodiment disposes a second level demux unit in the demux circuit 20. A plurality of second control units 24 and a plurality of second channel wirings 25 constitute the second level demux unit. The present embodiment can further reduce the lateral size of the demux circuit 20.

Furthermore, the signal transmission lines 23 further comprises a plurality of switch first channel wirings EM. a plurality of switch first channel wirings EM are arranged in the second direction Y. The switch first channel wirings EM are configured to transmit first control signals. The first switch first channel wirings EM1 and the second switch first channel wirings EM2 in FIG. 5 are only for exemplary illustrations and cannot be understood as limits to the present application.

In some embodiments of the present application, second control units 24 comprises a third transistor T3. A gate electrode of the third transistor T3 is electrically connected to a corresponding one of the switch first channel wirings EM. A source electrode of the third transistor T3 is electrically connected to a corresponding one of the first channel wirings 22. A drain electrode of the third transistor T3 is electrically connected to a corresponding one of the second channel wirings 25. The third transistor T3 is configured to control connection of the second channel wirings 25 with the corresponding ones of the first channel wirings 22 under control of the first control signals.

Furthermore, in some embodiments of the present application, a plurality of second control units 24 in the second direction Y are arranged in at least two rows such that a lateral size of the demux circuit 20 is further reduced. Specific descriptions refer to the arrangement of the first control units 21 of the above embodiments, which are not described repeatedly here.

Of course, in some embodiments of the present application, demux units of more levels can be disposed in the demux circuit 20, the present application has no specific limit thereto.

Accordingly, the present application further provides a display device. display device comprises a touch display panel and a touch chip. The touch display panel is the touch display panel of any one of the above embodiments, which can specifically refer to the above contents. The touch chip is connected to the touch display panel to receive touch signals.

In the present application, the display device can be smart phone, tablet, electronic reader, smart watch, camera, game player, etc., the present application has no limit thereto.

Figure 6:
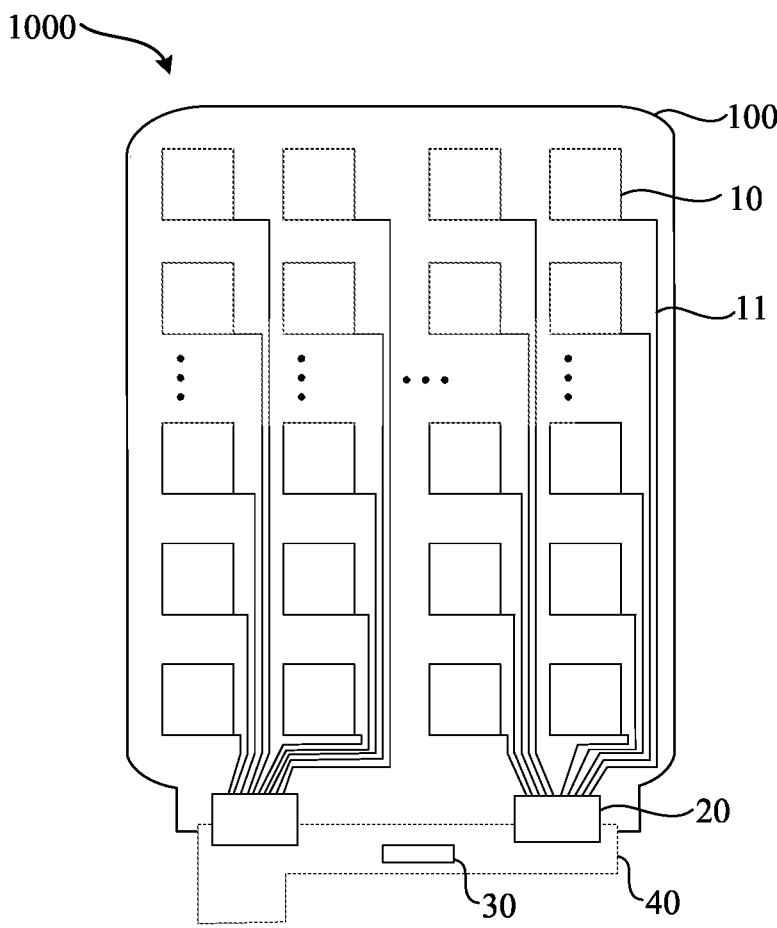
FIG. 6 is a schematic structural view of a display device provided by the present application.

In particular, with reference to FIG. 6, FIG. 6 is a schematic structural view of a display device provided by the present application. In the display device 1000 provided by the embodiment of the present application, the display device 1000 comprises the touch display panel 100, a touch chip 30 and a printed circuit board (PCB) 40. The touch chip 30 is disposed on the printed circuit board 40. The printed circuit board 40 is bonded to the touch display panel 100. the touch electrodes 10 is connected to the touch chip 30 through the touch wirings 11 and the demux circuit 20 to transmit touch signals to the touch chip 30 during touch. The touch chip 30 processes received touch signals to determine a touch location on the touch display panel 100.

The present application provides a display device 1000. The display device 1000 comprises the touch display panel 100. By disposing the demux circuit 20 in the touch display panel 100, the touch wirings 11 can commonly use the same one of the first channel wirings 22 to reduce a number of bonding pads in the touch display panel 100. Furthermore, disposing first control units in the demux circuit 20 in the second direction Y to be at least two rows can effectively reduce a lateral size (namely, the size in the first direction X) of the demux circuit 20 to improve application possibility of the self-capacitance touch in the ultra-narrow frame display device 1000.

The touch display panel and the display device provided by the embodiment of the present application are described in detail as above. The principles and implementations of the present application are described in the following by using specific examples. The embodiments as above should be considered descriptive for assisting understanding the methods and core concept of the present invention. Meanwhile, for those skilled in the art, according to the present the idea of invention, changes will be made in specific embodiment and application. In summary, the contents of this specification should not be construed as limiting the present application.

What is claimed is:

1. A touch display panel, comprising:

a plurality of touch wirings, wherein the touch wirings are arranged in a first direction; and a demux circuit, wherein the demux circuit comprises a plurality of first control units and a plurality of first channel wirings, the first channel wirings are arranged in the first direction, each of the first channel wirings is electrically connected to at least one of the first control units, and each of the first control units is electrically connected to a corresponding one of the touch wirings;

wherein the first control units are arranged in at least two rows in a second direction, the second direction intersects the first direction; and in the first direction, adjacent two of the first control units in adjacent two of at least some of the rows at least partially overlap each other;

wherein an interval between adjacent two of the first control units in the same column is less than a width of the first control unit.

2. The touch display panel according to claim 1, wherein the touch display panel further comprises first connection wirings, and the first control units are connected to the first channel wirings respectively through the first connection wirings;

wherein in the second direction, the first connection wirings corresponding to at least one of the first control units bend on edges of the first control units in adjacent ones of the rows.

3. The touch display panel according to claim 1, wherein in the second direction, the first control units corresponding to a $(2M-1)^{th}$ one of the touch wirings are arranged in a first row, the first control units corresponding to a $2M^{th}$ of the touch wirings are arranged in a second row, wherein M is an integer greater than or equal to 1.

4. The touch display panel according to claim 3, wherein each number N of adjacent ones of the touch wirings are electrically connected to the same one of the first channel wirings, N is an integer greater than or equal to 2; the demux circuit further comprises signal transmission lines, the signal transmission lines comprise driver wirings of a number N, enabling wirings of a number N, and control wirings of a number N, and the signal transmission lines are arranged in the second direction;

wherein the first control units of the number N electrically connected to the same one of the first channel wirings are electrically connected to corresponding ones of the driver wirings, the enabling wirings, and the control wirings respectively.

5. The touch display panel according to claim 4, wherein the touch display panel further comprises second connection wirings, the first control units are electrically connected to corresponding ones of the control wirings through the second connection wirings;

wherein in the second direction, the second connection wiring corresponding to at least one of the first control units bends on edges of the first control units in adjacent ones of the rows.

6. The touch display panel according to claim 4, wherein each of the first control units comprises a first transistor and a second transistor;

a gate electrode of the first transistor is electrically connected to a corresponding one of the control wirings, a source electrode of the first transistor is electrically connected to a corresponding one of the touch wirings, a drain electrode of the first transistor is electrically connected to a corresponding one of the first channel wirings; a gate electrode of the second transistor is electrically connected to a corresponding one of the enabling wirings, a source electrode of the second transistor is electrically connected to a corresponding one of the driver wirings, and a drain electrode of the second transistor is electrically connected to a corresponding one of the touch wirings.

7. The touch display panel according to claim 4, wherein in the second direction, the signal transmission lines are located on a side of the first control units of the second row away from the first control units of the first row.

8. The touch display panel according to claim 4, wherein in the second direction, the signal transmission lines correspondingly connected to the first control units of the first row are located between the first control units of the first row and the first control units of the second row; and the signal transmission lines correspondingly connected to the first control units of the second row are located on the side of the first control units of the second row away from the first control units of the first row.

9. The touch display panel according to claim 4, wherein in the first direction, in the first control units of the first row, the first control units located in an odd column are arranged in a first sub-row, the first control units in an even column are arranged in a second sub-row, in the first control units of the second row, the first control units located in the odd columns are arranged in a third sub-row, the first control units in the even column are arranged in a fourth sub-row.

10. The touch display panel according to claim 1, wherein the demux circuit further comprises a plurality of second control units and a plurality of second channel wirings;

the second control units are disposed on a side of the first channel wirings away from the first control units; the second channel wirings are arranged in the first direction, each of the second channel wirings are electrically connected to at least one of the first channel wirings; in the first channel wirings commonly employing the same one of the second channel wirings, each of the first channel wirings is connected to the second channel wiring through a corresponding one of the second control units, each of the second control units is configured to control connection between the second channel wiring and a corresponding one of the first channel wirings.

11. The touch display panel according to claim 10, wherein the second control units in the second direction are arranged in at least two rows.

12. The touch display panel according to claim 1, wherein the touch display panel further comprises touch electrodes, the touch electrodes are arranged in an array, the touch electrodes are correspondingly connected to the touch wirings one by one;

wherein the touch display panel comprises a first end portion and a second end portion disposed oppositely, the demux circuit is disposed at the first end portion, in the second direction, in each column of the touch electrodes, the touch wirings correspondingly connected to the touch electrodes arranged sequentially from the first end portion to the second end portion are sequentially arranged in the first direction.

13. A display device, comprising a touch display panel and a touch chip, and the touch display panel comprising:

a plurality of touch wirings, wherein the touch wirings are arranged in a first direction; and a demux circuit, wherein the demux circuit comprises a plurality of first control units and a plurality of first channel wirings, the first channel wirings are arranged in the first direction, each of the first channel wirings is electrically connected to at least one of the first control units, and each of the first control units is electrically connected to a corresponding one of the touch wirings;

wherein the first control units are arranged in at least two rows in a second direction, the second direction intersects the first direction; and in the first direction, adjacent two of the first control units in adjacent two of at least some of the rows at least partially overlap each other;

wherein the touch chip is connected to the touch display panel for receiving touch signals;

wherein an interval between adjacent two of the first control units in the same column is less than a width of the first control unit.

14. The display device according to claim 13, wherein the touch display panel further comprises first connection wirings, and the first control units are connected to the first channel wirings respectively through the first connection wirings;

wherein in the second direction, the first connection wirings corresponding to at least one of the first control units bend on edges of the first control units in adjacent ones of the rows.

15. The display device according to claim 13, wherein in the second direction, the first control units corresponding to a $(2M-1)^{th}$ one of the touch wirings are arranged in a first row, the first control units corresponding to a $2M^{th}$ of the touch wirings are arranged in a second row, wherein M is an integer greater than or equal to 1.

16. The display device according to claim 15, wherein each number N of adjacent ones of the touch wirings are electrically connected to the same one of the first channel wirings, N is an integer greater than or equal to 2; the demux circuit further comprises signal transmission lines, the signal transmission lines comprise driver wirings of a number N, enabling wirings of a number N, and control wirings of a number N, and the signal transmission lines are arranged in the second direction;

wherein the first control units of the number N electrically connected to the same one of the first channel wirings are electrically connected to corresponding ones of the driver wirings, the enabling wirings, and the control wirings respectively.

17. The display device according to claim 16, wherein the touch display panel further comprises second connection wirings, the first control units are electrically connected to corresponding ones of the control wirings through the second connection wirings;

wherein in the second direction, the second connection wiring corresponding to at least one of the first control units bends on edges of the first control units in adjacent ones of the rows.

18. The display device according to claim 13, wherein the touch display panel further comprises touch electrodes, the touch electrodes are arranged in an array, the touch electrodes are correspondingly connected to the touch wirings one by one;

wherein the touch display panel comprises a first end portion and a second end portion disposed oppositely, the demux circuit is disposed at the first end portion, in the second direction, in each column of the touch electrodes, the touch wirings correspondingly connected to the touch electrodes arranged sequentially from the first end portion to the second end portion are sequentially arranged in the first direction.

* * * * *